United States Patent
Weinheimer et al.

(10) Patent No.: US 11,328,491 B2
(45) Date of Patent: May 10, 2022

(54) COMPUTERIZED SYSTEM AND METHOD FOR AN EXTENDED REALITY (XR) PROGRESSIVE VISUALIZATION INTERFACE

(71) Applicant: AVEVA SOFTWARE, LLC, Lake Forest, CA (US)

(72) Inventors: Larry Weinheimer, Lake Forest, CA (US); Alessandro Giusti, Milan (IT); Leonardo Ballari, Lake Forest, CA (US); Chetan Katariya, Lake Forest, CA (US); Bonnie Mathew, Lake Forest, CA (US)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 0 days.

(21) Appl. No.: 17/094,955

(22) Filed: Nov. 11, 2020

(65) Prior Publication Data
US 2021/0142578 A1  May 13, 2021

Related U.S. Application Data

(60) Provisional application No. 62/933,822, filed on Nov. 11, 2019.

(51) Int. Cl.
| | |
|---|---|
| *G06T 19/00* | (2011.01) |
| *G06T 7/536* | (2017.01) |
| *G06K 9/00* | (2022.01) |
| *H04W 4/029* | (2018.01) |
| *G06F 3/01* | (2006.01) |

(52) U.S. Cl.
CPC ............ *G06T 19/006* (2013.01); *G06F 3/011* (2013.01); *G06K 9/00671* (2013.01); *G06T 7/536* (2017.01); *H04W 4/029* (2018.02)

(58) Field of Classification Search
None
See application file for complete search history.

(56) References Cited

U.S. PATENT DOCUMENTS

| | | | |
|---|---|---|---|
| 10,227,006 B2 | 3/2019 | Choi et al. | |
| 10,319,154 B1 | 6/2019 | Chakravarthula et al. | |
| 10,403,050 B1 * | 9/2019 | Beall | G02B 27/017 |
| 10,453,268 B2 | 10/2019 | Wyld et al. | |
| 2013/0057553 A1 * | 3/2013 | Chakravarthula | G06F 3/0484 |
| | | | 345/468 |

(Continued)

OTHER PUBLICATIONS

Korean Intellectual Property Office, International Search Report and Written Opinion for International Application No. PCT/US2020/059950, dated Feb. 26, 2021, 11 pages, Korea.

*Primary Examiner* — David H Chu
(74) *Attorney, Agent, or Firm* — Greenberg Traurig, LLP

(57) ABSTRACT

Disclosed are systems and methods for improving interactions with and between computers in content providing, displaying and/or hosting systems supported by or configured with devices, servers and/or platforms. The disclosed systems and methods provide a novel framework that displays an Extended Reality (XR) interface panel. The XR panel is configured to display and automatically and progressively adjust the panel and/or its displayed augmented reality (AR), virtual reality (VR) and/or mixed reality (MR) content based on dynamically determined and updated positioning of a viewing user.

17 Claims, 6 Drawing Sheets

(56) References Cited

U.S. PATENT DOCUMENTS

| | | | |
|---|---|---|---|
| 2015/0279105 A1* | 10/2015 | Hanai | G06F 3/0346 |
| | | | 345/633 |
| 2016/0027214 A1* | 1/2016 | Memmott | G02B 27/0172 |
| | | | 345/633 |
| 2016/0328883 A1* | 11/2016 | Parfenov | G06T 11/60 |
| 2017/0251356 A1* | 8/2017 | Andrade | H04W 8/08 |
| 2018/0129276 A1* | 5/2018 | Nguyen | G09B 9/00 |
| 2018/0211447 A1* | 7/2018 | Spayd | G09B 5/065 |
| 2019/0156583 A1* | 5/2019 | Wyld | G06T 19/006 |
| 2019/0172262 A1* | 6/2019 | McHugh | G06T 19/006 |
| 2019/0199993 A1* | 6/2019 | Babu J D | G06F 3/00 |
| 2019/0279407 A1 | 9/2019 | McHugh et al. | |
| 2019/0371076 A1* | 12/2019 | Douxchamps | G06F 3/0426 |

\* cited by examiner

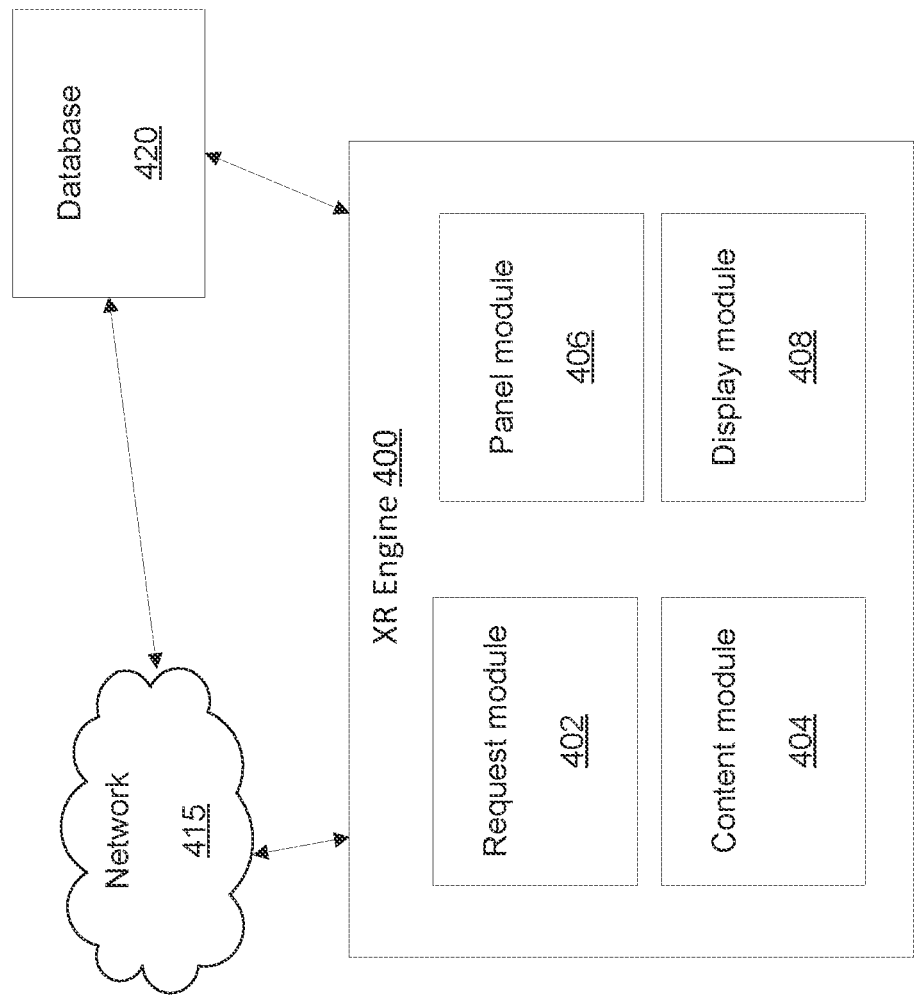

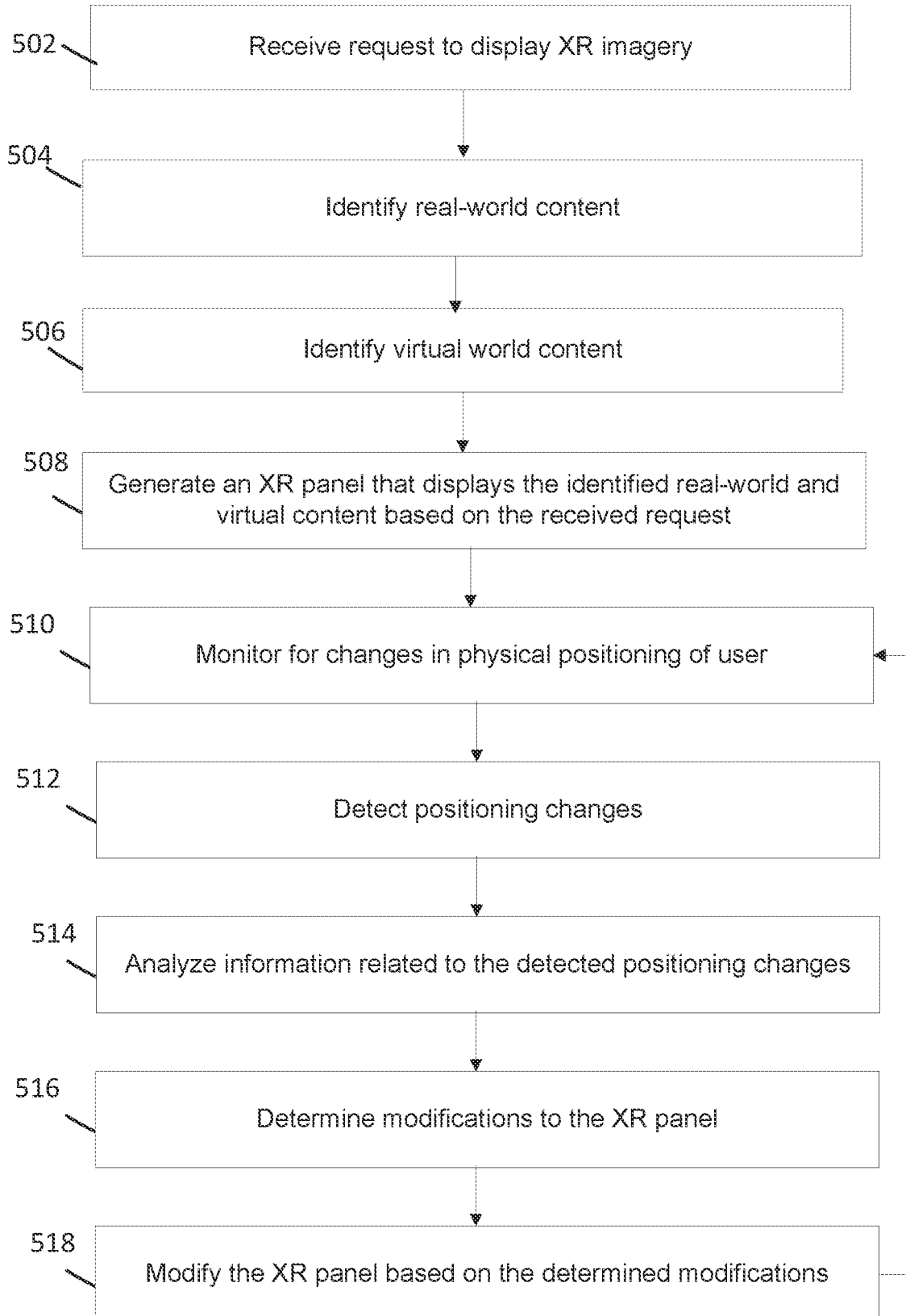

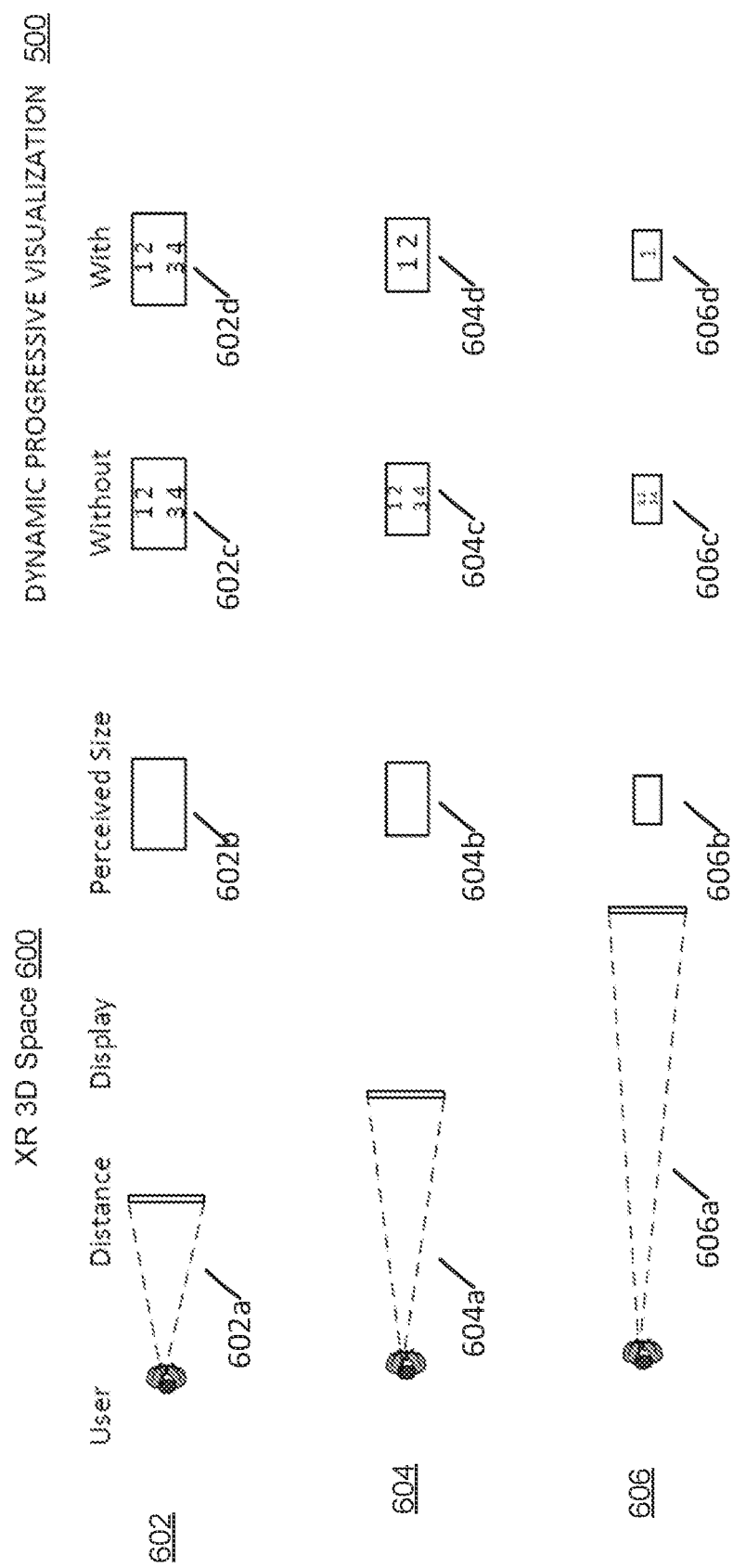

COMPUTERIZED SYSTEM AND METHOD FOR AN EXTENDED REALITY (XR) PROGRESSIVE VISUALIZATION INTERFACE

CROSS-REFERENCE TO RELATED APPLICATIONS

This application claims the benefit of priority from U.S. Provisional Application No. 62/933,822, filed Nov. 11, 2019, entitled "AR/VR Dynamic Progressive Visualization System and Server," which is incorporated herein by reference in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

Some embodiments relate generally to improving the performance of network-based computerized content displaying, hosting and providing devices, systems and/or platforms by modifying the capabilities and providing non-native functionality to such devices, systems and/or platforms through a novel and improved asset management and visualization framework for dynamically and progressively displaying and adjusting an extended reality display in order to maintain a high-quality display.

BACKGROUND

Extended Reality (XR) refers to all real-and-virtual environments generated by computer graphics and devices (including wearables). XR includes, Augmented reality (AR), Virtual reality (VR) and Mixed Reality (MR). AR applications allow a user to view a presentation of the world augmented with or superimposed by computer-generated imagery. VR applications provide a presentation of an entire digital world that is comprised of computer-generated imagery. And, MR applications provide an overlay of synthetic content that is anchored to and interacts with objects in the real world The imagery XR applications provide or display can be, for example, graphical or textual, static or dynamic, interactive, and/or some combination thereof. The presented world may be provided directly to the user, such that when the user is looking through a displayed interface, the computer imagery is applied to or projected on the interface appearing as integrated with the physical world, or constituting the physical world.

XR applications and functionality are now being implemented on mobile computing devices that include digital cameras or other image sensors, and/or are coupled or paired to viewing headsets, for example. For example, in some AR implementations, the view that is currently being captured by the camera can be displayed as a scene on a screen associated with the mobile device. In another example, in some VR implementations, the viewpoint of a user can dictate what and how the VR displays VR content.

SUMMARY

Some embodiments of the disclosed systems and methods provide advanced mechanisms that improve existing XR technology by providing a framework that dynamically and progressively adjusts the projected augmented reality imagery displayed within an XR capable user interface (UI). The disclosed systems and methods provide improved mechanisms for efficiently and accurately aligning, adjusting and displaying critical data within or as part of displayed imagery.

For purposes of the instant disclosure, reference will be made to "imagery" or "digital imagery" (used interchangeably) to reflect computer-generated content being displayed as part of an XR display, which one of skill in the art would understand to include and not be specifically tied to AR, VR and MR. The discussion of "imagery" as a whole or a general category is used to simplify the discussion and illustrate that the disclosed framework's dynamic adjustment of displayed imagery is applicable within AR, VR and MR displays.

Thus, one of ordinary skill in the art would understand that any type of XR environment and/or type of imagery can be utilized, such as, but not limited to, AR, VR or MR, without departing from the scope of the instant disclosure.

As discussed in more detail below, the instant disclosure's XR positioning and tracking systems and methods provide a more efficient system that maximizes the device's computational resources in order to efficiently and accurately determine the viewed object's distance, positioning and orientation respective to the viewing/capturing device thereby ensuring an efficiently and accurately rendered XR experience.

According to some embodiments, the disclosed framework provides a progressively adjusted imagery display within XR computing environments. For example, as discussed in more detail below, as illustrated in FIG. 6, the disclosed systems and methods enable dynamic progressive visualization within a XR three-dimensional (3D) space. As a user, for example, moves further away from an item depicted within an XR scene, the imagery can be adjusted so that only the most critical data is maintained within the display.

For example, in some embodiments, an XR display of an asset's data is produced in conjunction with a captured image of the physical asset at a jobsite. The user viewing the XR imagery, is at first 5 feet away from the asset. This, for example, will enable the user to view all operational data of the asset as an overlay of the digital capture of the physical asset. The user then moves 25 feet away. As a product of the execution of the disclosed systems and methods, it is determined that anomaly data of the asset is most important, for example, as it indicates an error or issue that needs to be addressed for the asset to function properly. Therefore, at the 25 foot distance, the XR imagery is adjusted based on the newly detected distance (e.g., 5 feet to 25 feet) and the determination of the critical operation data (e.g., the anomaly data). As a result, the AR imagery at 25 feet only includes the anomaly data in some embodiments.

Thus, according to some embodiments, the disclosed systems and method embody an electronic framework that provides asset management and visualization. Some embodiments of the invention involve composing selected data based on asset metrics and rendering a display that conveys a unified, asset-centric analytics user interface.

Some industrial sites employ hundreds or thousands of assets to carry out industrial operations. Ensuring the correct operation of assets is critical to managing an industrial site. Assets may experience several issues such as unscheduled downtime, failure, defects, maintenance, unproductivity, and other issues that affect the efficiency and workflow of the industrial site. Thus, in some embodiments, this data is taken into account when producing, maintaining and adjusting the provided XR imagery.

In some embodiments, the disclosed XR dynamic progressive visualization system, server and method can provide an interface to be dynamically produced, adjusted and maintained with regard to the type, quantity and form of information that is presented to a user.

In some embodiments, the interface can comprise a set of panels. Thus, in some embodiments, one panel can be dynamically adjusted while another panel within an interface can maintain its original depicted imagery. In some embodiments, the interface itself can be a panel. For purposes of this discussion, reference will be made to "panels" as constituting the display of the displayed XR imagery. Thus, a panel is an graphical interface that is capable of displaying electronic content on a display of a device.

In some embodiments, as the virtual distance between the user and the panel changes, the contents of the information can be altered so that the optimal information shown to the user is displayed. In some embodiments, this can involve modifying what is displayed in a panel. In some embodiments, this can involve modifying a panel's size, shape or any other type of display characteristic, feature or attribute. In some embodiments, modification of a panel's size or shape, for example, can also involve modification of what is displayed therein (e.g., the display of less information, as discussed above). In some embodiments, modifications to panel and the content included therein can be customized to a particular user, security clearance, a context, a location, a time period, and the like, or some combination thereof.

For example, at its furthest distance the panel can appear small and all but the most important information is removed. In some embodiments, as the distance is decreased, the apparent size of the visualize can be shrunk and more information is added to the panel.

In some embodiments, information presented to the user can provide for better decision making. Some embodiments providing as much information as is readable based on distance, thereby enhancing user efficiency and productivity. In some embodiments, readability determinations can be customized to the particular user or users.

In some embodiments, a dynamic panel can be described by a designer within the created XR space, which defines the panel in such a way as the visualizations are arranged so that they are progressively added to the panel for the user based on distance. In some embodiments, a preview function within the editor can allow the designer to test the designs.

According to some embodiments, a computer-implemented method is disclosed which displays an XR panel, and automatically and progressively adjusts the panel and/or its content based on dynamically determined positioning of a viewing user.

Some embodiments provide a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., application server, messaging server, email server, ad server, content server and/or client device, and the like) cause at least one processor to perform a method for a novel and improved framework which displays an XR panel, and automatically and progressively adjusts the panel and/or its content based on dynamically determined positioning of a viewing user.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

According to some embodiments, a computing device is disclosed which comprises: one or more processors; and a non-transitory computer-readable memory having stored therein computer-executable instructions, that when executed by the one or more processors, cause the one or more processors to perform actions comprising: receiving a request to generate an Extended Reality (XR) display, the request comprising information related to operation of a physical asset at a location, the request comprising first positioning information corresponding to an initial physical distance between a user and the physical asset; identifying, based on the request, real-world content and virtual content corresponding to the physical asset; generating and displaying an XR panel based on the identified real-world content, the identified virtual content and the first positioning information, the XR panel being an interface that displays the identified real-world content and virtual content as XR imagery in accordance with the initial physical distance information; detecting second positioning information of the user, the second positioning information corresponding to an updated distance between the user and physical asset; analyzing the displayed XR imagery displayed within the XR panel based on the second positioning information, and based on the analysis, determining modifications of the XR panel; and automatically modifying the XR panel based on the determined modifications.

In some embodiments, the modifications comprise adjusting display characteristics of the XR panel based on the second positioning information. In some embodiments, the display characteristics corresponds to at least one of a size or shape of the XR panel. In some embodiments, the adjustment of the display characteristics is based on a computed difference between the first positioning information and the second positioning information.

In some embodiments, the modifications comprise: analyzing the real-world content based on a computed difference between the first positioning information and the second positioning information; analyzing the virtual content based on a computed difference between the first positioning information and the second positioning information; and adjusting the XR imagery based on the analyses.

In some embodiments, the adjustment of the XR imagery comprises: determining a value of importance for the real-world content; determining a value of importance for the virtual content; and identifying a portion of at least one of the real-world content and the virtual content based on the determined values, wherein the modified XR panel displays the portion.

In some embodiments, the action further comprise monitoring information related to the user, the information corresponding to periodically identified Global Positioning System (GPS) data of the user at the location. In some embodiments, the action further comprise: analyzing the monitored information of the user; and determining, based on the analysis, a threshold satisfying positioning change of the user, the positioning change corresponding to a change in physical distance between the user and the physical asset, wherein the detected second positioning information is based on the determination.

In some embodiments, the XR imagery comprises one of a augmented reality (AR) imagery, virtual reality (VR) imagery, and mixed reality (MR) imagery.

In some embodiments, the request further comprises an identifier of the user. In some embodiments, the actions further comprise: identifying contextual information related to the user based on the identifier; and customizing the XR imagery within the XR panel based on the contextual information.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 4 is a block diagram illustrating components of an exemplary system in accordance with embodiments of the present disclosure;

FIG. 5 details a non-limiting data flow according to some embodiments of the present disclosure; and FIG. 6 illustrates non-limiting example embodiments according to some embodiments of the present disclosure.

DESCRIPTION OF EMBODIMENTS

Figure 1:
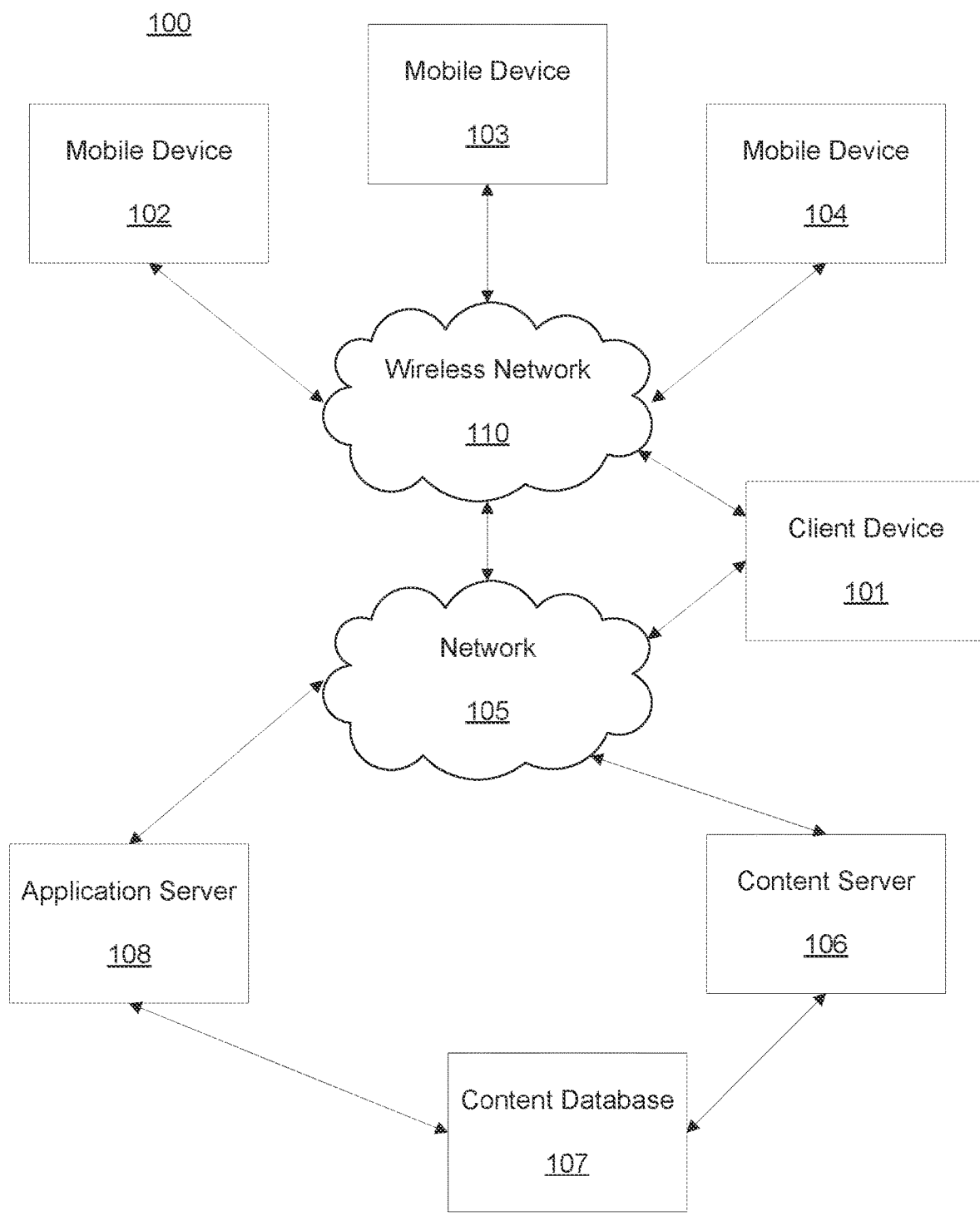
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure, a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments will now be described in greater detail with reference to the figures. In general, with reference to FIG. 1, a system 100 in accordance with some embodiments of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")-network 105, wireless network 110, mobile devices (client devices) 102-104 and client device 101. FIG. 1 additionally includes a variety of servers, such as content server 106 and application (or "App") server 108.

Some embodiments of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. In some embodiments, mobile devices 102-104 may also communicate with non-mobile client devices, such as client device 101, or the like. In some embodiments, such communications may include sending and/or receiving messages, creating and uploading documents, searching for, viewing and/or sharing memes, photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

In some embodiments, wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

In some embodiments, network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

In some embodiments, the content server 106 may include a device that includes a configuration to provide any type or form of content via a network to another device. Devices that may operate as content server 106 include personal computers, desktop computers, multiprocessor systems, microprocessor-based or programmable consumer electronics, network PCs, servers, and the like. In some embodiments, content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like. Such services, for example the email services and email platform, can be provided via the message server 120.

In some embodiments, users are able to access services provided by servers 106 and 108. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, application server 108, for example, can store various types of applications and application related information including application data and user profile information (e.g., identifying, generated and/or observed information associated with a user).

In some embodiments, content server 106 and app server 108 can store various types of data related to the content and services each provide, observe, identify, determine, generate, modify, retrieve and/or collect. Such data can be stored in an associated content database 107, as discussed in more detail below.

In some embodiments, server 106 and/or 108 can be embodied as a cloud server or configured for hosting cloud services, as discussed herein.

In some embodiments, the network 105 is also coupled with/connected to a Trusted Search Server (TSS) which can be utilized to render content in accordance with the embodiments discussed herein. Embodiments exist where the TSS functionality can be embodied within servers 106 and 108.

Moreover, although FIG. 1 illustrates servers 106 and 108 as single computing devices, respectively, the disclosure is not so limited. For example, one or more functions of servers 106 and 108 may be distributed across one or more distinct computing devices. Moreover, in some embodiments, servers 106 and 108 may be integrated into a single computing device, without departing from the scope of the present disclosure.

Additionally, while the illustrated embodiment in FIG. 1 depicts only servers 106 and 108, it should not be construed as limiting, as any type and number of servers can be included therein.

Figure 2:
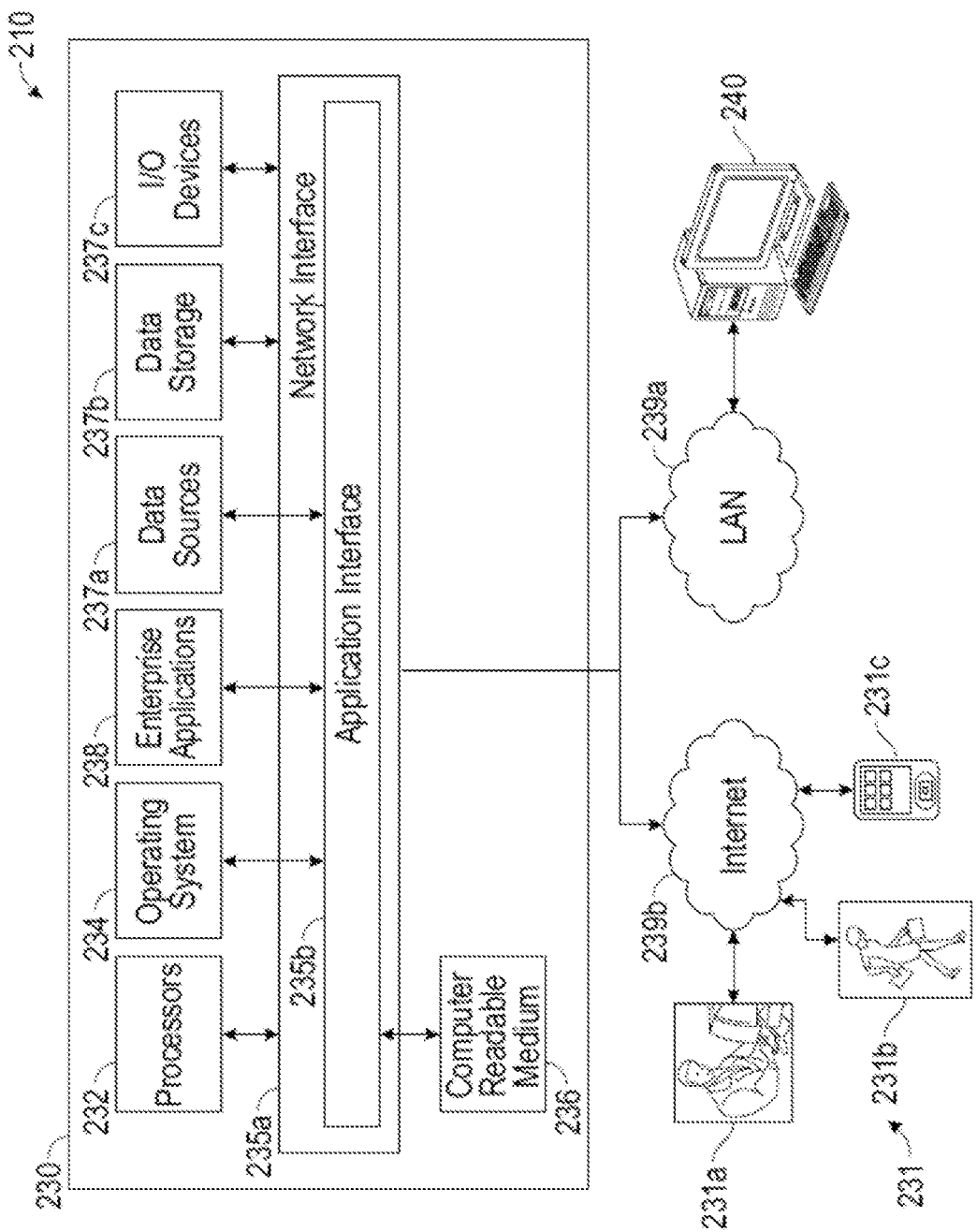
FIG. 2 is a schematic diagram illustrating an example of a network within which the systems and methods disclosed herein could be implemented according to some embodiments of the present disclosure.

Turning to FIG. 2, computer system 210 is depicted and is a non-limiting example embodiment of system 100 discussed above in relation to FIG. 1.

FIG. 2 illustrates a computer system 210 enabling or operating an embodiment of system 100 of FIG. 1, as discussed below. In some embodiments, computer system 210 can include and/or operate and/or process computer-executable code of one or more of the above-mentioned program logic, software modules, and/or systems. Further, in some embodiments, the computer system 210 can operate and/or display information within one or more graphical user interfaces. In some embodiments, the computer system 210 can comprise a cloud server and/or can be coupled to one or more cloud-based server systems.

In some embodiments, the system 210 can comprise at least one computing device 230 including at least one processor 232. In some embodiments, the at least one processor 232 can include a processor residing in, or coupled to, one or more server platforms. In some embodiments, the system 210 can include a network interface 235*a* and an application interface 235*b* coupled to the least one processor 232 capable of processing at least one operating system 234. Further, in some embodiments, the interfaces 235*a*, 235*b* coupled to at least one processor 232 can be configured to process one or more of the software modules 238 (e.g., such as enterprise applications). In some embodiments, the software modules 238 can include server-based software, and can operate to host at least one user account and/or at least one client account, and operating to transfer data between one or more of these accounts using the at least one processor 232.

With the above embodiments in mind, it should be understood that some embodiments can employ various computer-implemented operations involving data stored in computer systems. Moreover, the above-described databases and models described throughout can store analytical models and other data on computer-readable storage media within the system 210 and on computer-readable storage media coupled to the system 210. In addition, the above-described applications of the system can be stored on non-transitory computer-readable storage media within the system 210 and on computer-readable storage media coupled to the system 210.

In some embodiments, the system 210 can comprise at least one non-transitory computer readable medium 236 coupled to at least one data source 237*a*, and/or at least one data storage device 237*b*, and/or at least one input/output device 237*c*. In some embodiments, the disclosed systems and methods can be embodied as computer readable code on a computer readable medium 236. In some embodiments, the computer readable medium 236 can be any data storage device that can store data, which can thereafter be read by a computer system (such as the system 210). In some embodiments, the computer readable medium 236 can be any physical or material medium that can be used to tangibly store the desired information or data or instructions and which can be accessed by a computer or processor 232. In some embodiments, at least one of the software modules 238 can be configured within the system to output data to at least one user 231 via at least one graphical user interface rendered on at least one digital display.

In some embodiments, the non-transitory computer readable medium 236 can be distributed over a conventional computer network via the network interface 235*a* where the system embodied by the computer readable code can be stored and executed in a distributed fashion. For example, in some embodiments, one or more components of the system 210 can be coupled to send and/or receive data through a local area network ("LAN") 239*a* and/or an internet coupled network 239*b* (e.g., such as a wireless internet). In some further embodiments, the networks 239*a*, 239*b* can include wide area networks ("WAN"), direct connections (e.g., through a universal serial bus port), or other forms of computer-readable media 236, or any combination thereof.

In some embodiments, components of the networks 239*a*, 239*b* can include any number of user devices such as personal computers including for example desktop computers, and/or laptop computers, or any fixed, generally non-mobile internet appliances coupled through the LAN 239*a*. For example, some embodiments include personal computers 240*a* coupled through the LAN 239*a* that can be configured for any type of user including an administrator. Other embodiments can include personal computers coupled through network 239b. In some further embodiments, one or more components of the system 210 can be coupled to send or receive data through an internet network (e.g., such as network 239b). For example, some embodiments include at least one user 231 coupled wirelessly and accessing one or more software modules of the system including at least one enterprise application 238 via an input and output ("I/O") device 237c. In some other embodiments, the system 210 can enable at least one user 231 to be coupled to access enterprise applications 238 via an I/O device 237c through LAN 239a. In some embodiments, the user 231 can comprise a user 231a coupled to the system 210 using a desktop computer, and/or laptop computers, or any fixed, generally non-mobile internet appliances coupled through the internet 239b. In some embodiments, the user 231 can comprise a mobile user 231b coupled to the system 210. In some embodiments, the user 231b can use any mobile computing device 231c to wirelessly coupled to the system 210, including, but not limited to, personal digital assistants, and/or cellular phones, mobile phones, or smart phones, and/or pagers, and/or digital tablets, and/or fixed or mobile internet appliances.

Figure 3:
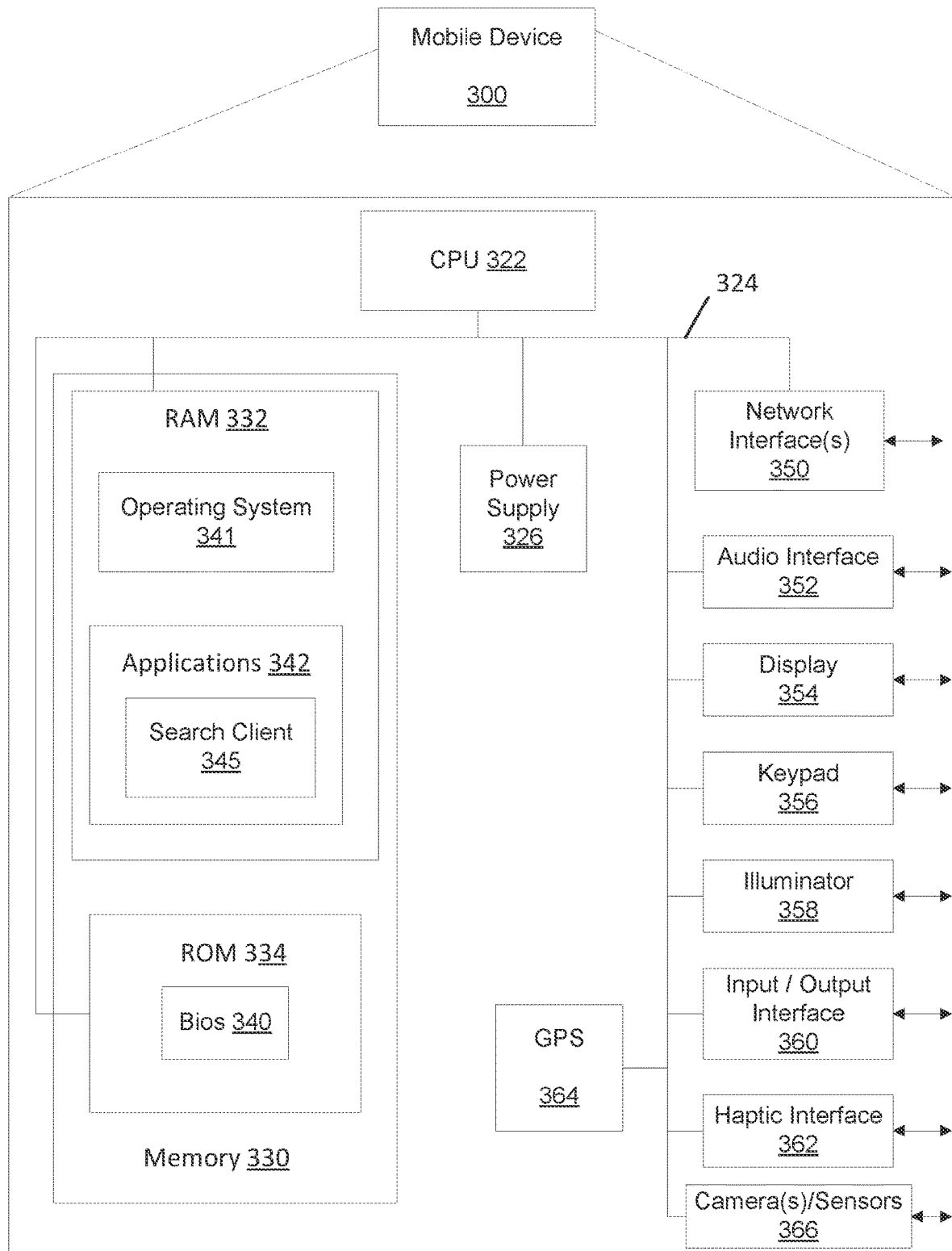
FIG. 3 depicts is a schematic diagram illustrating an example of client device according to some embodiments of the present disclosure.

FIG. 3 is a schematic diagram illustrating a client device showing an example embodiment of a client device that may be used within the present disclosure. Client device 300 may include many more or less components than those shown in FIG. 3. However, the components shown are sufficient to disclose an illustrative embodiment for implementing the present disclosure. Client device 300 may represent, for example, client devices discussed above in relation to FIGS. 1-2.

As shown in FIG. 3, in some embodiments, Client device 300 includes a processing unit (CPU) 322 in communication with a mass memory 330 via a bus 324. In some embodiments, Client device 300 also includes a power supply 326, one or more network interfaces 350, an audio interface 352, a display 354, a keypad 356, an illuminator 358, an input/output interface 360, a haptic interface 362, an optional global positioning systems (GPS) receiver 364 and a camera(s) or other optical, thermal or electromagnetic sensors 366. Device 300 can include one camera/sensor 366, or a plurality of cameras/sensors 366, as understood by those of skill in the art. Power supply 326 provides power to Client device 300.

Client device 300 may optionally communicate with a base station (not shown), or directly with another computing device. Network interface 350 is sometimes known as a transceiver, transceiving device, or network interface card (NIC).

In some embodiments, audio interface 352 is arranged to produce and receive audio signals such as the sound of a human voice. Display 354 may be a liquid crystal display (LCD), gas plasma, light emitting diode (LED), or any other type of display used with a computing device. Display 354 may also include a touch sensitive screen arranged to receive input from an object such as a stylus or a digit from a human hand.

Keypad 356 may comprise any input device arranged to receive input from a user. Illuminator 358 may provide a status indication and/or provide light.

In some embodiments, client device 300 also comprises input/output interface 360 for communicating with external. Input/output interface 360 can utilize one or more communication technologies, such as USB, infrared, Bluetooth™, or the like. In some embodiments, haptic interface 362 is arranged to provide tactile feedback to a user of the client device.

Optional GPS transceiver 364 can determine the physical coordinates of Client device 300 on the surface of the Earth, which typically outputs a location as latitude and longitude values. GPS transceiver 364 can also employ other geo-positioning mechanisms, including, but not limited to, tri-angulation, assisted GPS (AGPS), E-OTD, CI, SAI, ETA, BSS or the like, to further determine the physical location of Client device 300 on the surface of the Earth. In some embodiments, however, Client device may through other components, provide other information that may be employed to determine a physical location of the device, including for example, a MAC address, Internet Protocol (IP) address, or the like.

In some embodiments, mass memory 330 includes a RAM 332, a ROM 334, and other storage means. Mass memory 330 illustrates another example of computer storage media for storage of information such as computer readable instructions, data structures, program modules or other data. Mass memory 330 stores a basic input/output system ("BIOS") 340 for controlling low-level operation of Client device 300. The mass memory also stores an operating system 341 for controlling the operation of Client device 300.

In some embodiments, memory 330 further includes one or more data stores, which can be utilized by Client device 300 to store, among other things, applications 342 and/or other information or data. For example, data stores may be employed to store information that describes various capabilities of Client device 300. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 300.

In some embodiments, applications 342 may include computer executable instructions which, when executed by Client device 300, transmit, receive, and/or otherwise process audio, video, images, and enable telecommunication with a server and/or another user of another client device. In some embodiments, applications 342 may further include search client 345 that is configured to send, to receive, and/or to otherwise process a search query and/or search result.

Having described the components of the general architecture employed within some embodiments, the components' general operation with respect to some embodiments will now be described below.

FIG. 4 is a block diagram illustrating the components of some embodiments. FIG. 4 includes Extended Reality (XR) engine 400, network 415 and database 420. The XR engine 400 can be a special purpose machine or processor and could be hosted by a cloud server (e.g., cloud web services server(s)), messaging server, application server, content server, social networking server, web server, search server, content provider, third party server, user's computing device, and the like, or any combination thereof.

According to some embodiments, XR engine 400 can be embodied as a stand-alone application that executes on a server and/or user device (e.g., on a cloud server and/or on-prem on a user device or local storage). In some embodiments, the XR engine 400 can function as an application installed on a device; and, in some embodiments, such application can be a web-based application accessed by a device over a network. In some embodiments, engine 400 can be configured as a script or extension that enhances how another application or device operates (for example, an XR script that improves and provides non-native functionality to XR applications and hardware on a iPhone® or Samsung® wearable, and the like).

The database 420 can be any type of database or memory, and can be associated with a content server on a network (e.g., cloud server, content server, a search server or application server) or a user's device (e.g., client devices discussed above in FIGS. 1-3). Database 420 comprises a dataset of data and metadata associated with local and/or network information related to users, services, applications, content and the like. Such information can be stored and indexed in the database 420 independently and/or as a linked or associated dataset. As discussed above, it should be understood that the data (and metadata) in the database 420 can be any type of information and type, whether known or to be known, without departing from the scope of the present disclosure.

According to some embodiments, database 420 can store data and metadata associated with users, operations, tasks, assets, files, projects, versions, synchronization events, schedules, images, videos, text, messages, products, items and services from an assortment of media and/or service providers and/or platforms, and the like.

According to some embodiments, database 420 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof.

In some embodiments, the user data can also include user device information, including, but not limited to, device identifying information, device capability information, voice/data carrier information, applications installed or capable of being installed or executed on such device, and/or any, or some combination thereof. It should be understood that the data (and metadata) in the database 420 can be any type of information related to a user, asset, location, job, operation, content, a device, an application, a service provider, a content provider, whether known or to be known, without departing from the scope of the present disclosure.

As discussed above, with reference to FIGS. 1-2, the network 415 can be any type of network such as, but not limited to, a wireless network, a local area network (LAN), wide area network (WAN), the Internet, or a combination thereof. The network 415 facilitates connectivity of the XR engine 400, and the database of stored resources 420. Indeed, as illustrated in FIG. 4, the XR engine 400 and database 420 can be directly connected by any known or to be known method of connecting and/or enabling communication between such devices and resources.

The principal processor, server, or combination of devices that comprises hardware programmed in accordance with the special purpose functions herein is referred to for convenience as XR engine 400, and includes request module 402, content module 404; panel module 406 and display module 408. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Turning now to FIGS. 5 and 6, non-limiting embodiments are discussed that detail how the disclosed progressively, dynamically adjusted panel display is provided and maintained.

Process 500 embodies a dynamic progressive visualization, and is depicted in FIG. 5; and, will be discussed in accordance with the example embodiment illustrated in FIG. 6, which provides an example of how dynamic, progressive visualization 500 is provided within an XR three-dimensional (3D) space 600.

According to some embodiments of Process 500, Step 502 is performed by request module 402 of XR engine 400; Steps 504 and 506 are performed by content module 404; Steps 508 and 518 are performed by display module 408; and Steps 510-516 are performed by panel module 406.

Process 500 begins with Step 502 where a request to display XR imagery on a device of a user is received. As discussed above, the XR imagery can include, but is not limited to, AR, VR or MR imagery.

In some embodiments, the request can be a user provided input, which can be a selection of an application, hyperlink, Uniform Resource Locator (URL), icon, text entry, voice input, or other biometric input, and the like, or some combination thereof. In some embodiments, the input can be associated with an application executed or associated with engine 400.

In some embodiments, the request can be automatically generated and provided by a device of the user, an application executing or being accessed by a user, or by a server, and the like, or some combination thereof. In some embodiments, the request can be automatically generated based on a detected criteria associated with a user or the user's device, such as, but not limited to, viewing data about an asset, viewing data about a location, viewing data about an operation or task, being at a particular location, being a particular time, performing a specific type of activity, and the like, or some combination thereof.

In some embodiments, the request can include information about the user or the device being used to generate the request (e.g., the user's device). In some embodiments, the request can include data and/or metadata indicating, but not limited to, a location or position of a user (e.g., GPS data), Bluetooth low energy signal (BLE) signal data that can be used to determine a device's positioning relative to another device/location/transmitter; an identifier of the user or device, and the like, or some combination thereof.

In some embodiments, the request can also identify a particular location or scene that will be form the basis of or at least be a part of the XR display. For example, the request can be triggered by the user capturing a picture or video (e.g., a frame or series of frames) of a location via a camera on his/her device.

Thus, according to some embodiments, the request captured in Step 502 at least comprises an indication of a user's desire to render an XR display panel and a distance or location (e.g., referred to as position data) of the user or user's device. In some embodiments, the request can indicate a type of XR panel—e.g., the request can specify that the panel display is to render AR imagery, for example.

In Step 504, real-world content is identified. As discussed above and understood by those of skill in the art, real-world content forms at least a basis or part of an XR display. Real-world content includes captured digital representations of a real-world or physical world location, item or object, and can be a video, image, or other form of digital content that renders a digital display of a real-world location, item, object and the like. For example, a capturing (via a camera of a device) of a jobsite's tools as they operate (e.g., an oil derrick articulating).

Thus, in response to the request of Step 502, real-world content is identified.

In some embodiments, the real-world content can be identified as a product of a search performed in response to data included in the request of Step 502. In some embodiments, Step 504 can involve a process where the request is parsed and as a result the real-world content is extracted therefrom.

Step 506 involves the identification of the virtual world content that will further constitute the requested XR imagery. Identification of the virtual world content is performed in a similar manner as discussed above in relation to Step 504.

In some embodiments, the virtual world content comprises digital content that will overlay or integrate with other content (e.g., real-world content) or data that enables a virtual world to be realized via the requested XR panel.

According to some embodiments of Steps 504 and 506, the type, quantity and/or quality of the identified real-world content (from Step 504) and the virtual world content (from Step 506) can be based on a type of XR imagery. For example, if the requested imagery from Step 502 is an VR panel, then the virtual world content may be the only content identified, as a VR experience can be a totally virtually immersive experience. However, in some embodiments, real-world content can still be identified and used as a basis for identifying the virtual content that will constitute the VR display (e.g., identify the real-world content, and use it as a basis for generating or identifying virtual world content that will constitute the VR experience).

In Step 508, based on the information from the request (of Step 502) and the identified content from Step 504 and 506, an XR panel is generated that displays XR imagery. According to some embodiments, the XR imagery displayed within the panel can be compiled, generated or otherwise created and displayed using any known or to be known XR functionality, such as, for example, computer vision.

By way of a non-limiting example, as illustrated in FIG. 6, user 602 is viewing an item at distance 602*a*. As a result of executing Steps 502-508, a panel 602*b* is produced. The XR panel provides a display of XR imagery of the item based on the identified real-world and virtual world content associated therewith.

As illustrated in example panels 602*c* and 602*d* (which are example embodiments of panel 602*b*), they display content "1 2 3 4". This content is the combination of the virtual and real-world content that is initially generated based on the viewing distance 602*a* from a request from Process 500's Step 502. Since this is the initial viewing of the XR panel, the content in panels 602*c* and 602*d* are the same as the progressive processing has not yet needed to be performed—therefore, how the data is improved via Process 500 is not yet evident (at this stage).

In some embodiments, as discussed above, in addition to the XR panel being based on the distance and identified content, it can also be based on a user identifier, such that the XR display is personalized based on identified behavioral or contextual information related to the user. For example, if the user is a maintenance engineer at a jobsite, she would want to view all the critical anomalies that have occurred since the last check. Therefore, the XR imagery within the XR panel can be customized to show only that type of information.

Turning back to Process 500, Step 510 involves monitoring for changes in physical positioning of the user or the user's device. Such monitoring can include, but is not limited to, periodically pinging or requesting location or positioning information of the user/user device, monitoring, for example, GPS data of the user device to determine if the user has moved positions more than a threshold amount of distance, awaiting another request from a user, and the like, or some combination thereof.

In Step 512, a positioning change is determined, detected, derived, received or otherwise identified by engine 400. For example, a user has changed positions relative to a location a threshold satisfying amount of distance.

For example, a user is initially viewing a physical asset and virtually overlaid data (via an XR panel, e.g., panel 602*b*) at a distance 602*a* of 5 feet. The user, now referred to as user 604 in FIG. 6, moves to a distance of 25 feet (item 604*a*), which satisfies an example threshold of 20 feet of movement).

In Step 514, as a result of the detected position change, information related to the position change, and information related to the initially produced XR panel are analyzed. In some embodiments, according to Step 516, the analysis involves analyzing the identified real world and virtual world content to determine how they should be modified based on the newly detected distance (e.g., the position change from Step 512). Then, in Step 518, the XR panel is automatically modified based on the determined modifications from Step 516.

According to some embodiments, the analysis and determination of the modifications to be performed to the XR panel can involve any type of known or to be known computational analysis technique, including but not limited to, vector analysis, data mining, computer vision, machine learning, neural network, artificial intelligence, and the like, or some combination thereof.

By way of a non-limiting example, panel 602*b*, which is viewed from the original distance 602*a* depicts XR content "1 2 3 4" (as illustrated in example panels 602*c* and 602*d*).

Upon the user 602 moving from a distance 602*a* to a new position 604*a* (now referenced as user 604), the information displayed in the XR panel changes to what is displayed in panel 604*b*. As illustrated in FIG. 6, using the processing of Process 500, the content changes from "1 2 3 4" (as in panel 604*c*) to what is displayed in panel 604*d*. This analysis and modification, for example, identifies which is the critical information that is most important or responsive to the request (from Step 502).

Thus, in some embodiments, as the user moves away from the initially viewed object, the amount of information displayed is reduced, yet the critical or important information is identified and its display is maintained.

In some embodiments, the modification can involve analyzing the content, determining a value of its importance (e.g. its similarity to the request or contextual relationship to the asset or user, for example), and then maintaining only the highest ranked content (e.g., or a set of content above a threshold similarity level).

In some embodiments, the modification can involve changing the size or shape of the panel, such that the quantity of content is not changed, but the display size and/or shape is changed which causes the content displayed therein to be re-organized to display the more important content (e.g., the higher ranked content).

By way of further non-limiting example, as illustrated in FIG. 6, user 604 moves from distance 604*a* to distance 606*a* (now referenced as user 606). As illustrated in FIG. 6, distance 606a is further way from the object being viewed than distance 604a (and also 602a). Thus, upon detecting this change in distance (Steps 510-512), the information displayed in panel 604b (which displays content in panel 604d) is analyzed in accordance with the new distance, and the critical data and modifications to account for the new distance is determined (Step 516).

As a result, panel 604b changes to 606b and displays the content provided as an exemplary in panel 606d. Without the processing in Process 500, the panel 606b would display "1 2 3 4" (as in panel 606c) which is how it would be perceived in conventional systems, where the distance would not be accounted for and the content displayed therein would not change, which would render the content almost unreadable at distance 606a. However, through the advent of the disclosed technology, the content is modified to change to "1", which is identified as the most important or highest ranking content. This modification also accounts for the panel's size (or shape), as the amount of content that can be legibly displayed or displayed in a readable manner from distance 606a dictates the quantity of content displayed from the ranked set.

It should be understood that as a user moves closer to an item, Process 500 works in reverse order and more content can be identified and added to a XR panel's display in a similar manner. Thus, while the discussion above is based on a user moving further away from an item or location, it should not be construed as limiting, as any directional movement or rotation around an item would cause engine 400 to operate in a similar manner as disclosed herein.

At the conclusion of Process 500, after the modification of the displayed XR panel, as in Step 518, Process 500 recursively reverts to Step 510 such that monitoring of new positions can continue. For example, user 606 can move to position 604b or can move back to initial position 602a, and the like, for example, which would trigger Steps 512-518 to execute again.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternative embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A computing device comprising:
   one or more processors;
   a non-transitory computer-readable memory having stored therein computer-executable instructions, that when executed by the one or more processors, cause the one or more processors to perform actions comprising:
      receiving a request to generate an Extended Reality (XR) display, the request comprising information related to operation of a physical asset at a location, the request comprising first positioning information corresponding to an initial physical distance between a user and the physical asset;
      identifying, based on said request, real-world content and virtual content corresponding to the physical asset;
      generating and displaying an XR panel based on the identified real-world content, the identified virtual content and the first positioning information, the XR panel being an interface that displays the identified real-world content and the identified virtual content as XR imagery in accordance with the initial physical distance information;
      detecting second positioning information of the user, the second positioning information corresponding to an updated distance between the user and physical asset;
      analyzing the displayed XR imagery displayed within the XR panel based on said second positioning information, and based on said analysis of the displayed XR imagery, determining modifications of the XR panel; and automatically modifying the XR panel based on said determined modifications;

wherein said modifications comprise:

analyzing the real-world content based on a computed difference between the first positioning information and the second positioning information;

analyzing the virtual content based on a computed difference between the first positioning information and the second positioning information; and adjusting the XR imagery based on said analyses of the real-world content and the virtual content.

2. The computing device of claim 1, wherein said modifications comprise adjusting display characteristics of the XR panel based on said second positioning information.

3. The computing device of claim 2, wherein said display characteristics corresponds to at least one of a size or shape of the XR panel.

4. The computing device of claim 2, wherein said adjustment of the display characteristics is based on a computed difference between the first positioning information and the second positioning information.

5. The computing device of claim 1, wherein said adjustment of the XR imagery comprises:

determining a value of importance for the real-world content;

determining a value of importance for the virtual content; and identifying a portion of at least one of the real-world content and the virtual content based on the determined values, wherein said modified XR panel displays said portion.

6. The computing device of claim 1, further comprising:

monitoring information related to the user, the information corresponding to periodically identified Global Positioning System (GPS) data of the user at the location.

7. The computing device of claim 6, further comprising:

analyzing the monitored information of the user; and determining, based on said analysis, a threshold satisfying positioning change of the user, the positioning change corresponding to a change in physical distance between the user and the physical asset, wherein said detected second positioning information is based on said determination.

8. The computing device of claim 1, wherein said XR imagery comprises one of a augmented reality (AR) imagery, virtual reality (VR) imagery, and mixed reality (MR) imagery.

9. The computing device of claim 1, wherein said request further comprises an identifier of the user.

10. The computing device of claim 9, further comprising:

identifying contextual information related to the user based on said identifier; and customizing the XR imagery within the XR panel based on said contextual information.

11. A method comprising:

receiving, by a computing device, a request to generate an Extended Reality (XR) display, the request comprising information related to operation of a physical asset at a location, the request comprising first positioning information corresponding to an initial physical distance between a user and the physical asset;

identifying, by the computing device, based on said request, real-world content and virtual content corresponding to the physical asset;

generating and displaying, by the computing device, an XR panel based on the identified real-world content, the identified virtual content and the first positioning information, the XR panel being an interface that displays the identified real-world content and virtual content as XR imagery in accordance with the initial physical distance information;

detecting, by the computing device, second positioning information of the user, the second positioning information corresponding to an updated distance between the user and physical asset;

analyzing, by the computing device, the displayed XR imagery displayed within the XR panel based on said second positioning information, and based on said analysis of the displayed XR imagery, determining modifications of the XR panel; and automatically modifying, by the computing device, the XR panel based on said determined modifications;

wherein said modifications comprise:

analyzing the real-world content based on a computed difference between the first positioning information and the second positioning information;

analyzing the virtual content based on a computed difference between the first positioning information and the second positioning information; and adjusting the XR imagery based on said analyses of the real-world content and the virtual content.

12. The method of claim 11, wherein said modifications comprise adjusting display characteristics of the XR panel based on said second positioning information, wherein said adjustment of the display characteristics is based on a computed difference between the first positioning information and the second positioning information.

13. The method of claim 11, wherein said display characteristics corresponds to at least one of a size or shape of the XR panel.

14. The method of claim 11, wherein said adjustment of the XR imagery comprises:

determining a value of importance for the real-world content;

determining a value of importance for the virtual content; and identifying a portion of at least one of the real-world content and the virtual content based on the determined values, wherein said modified XR panel displays said portion.

15. The method of claim 11, further comprising:

monitoring information related to the user, the information corresponding to periodically identified Global Positioning System (GPS) data of the user at the location;

analyzing the monitored information of the user; and determining, based on said analysis, a threshold satisfying positioning change of the user, the positioning change corresponding to a change in physical distance between the user and the physical asset, wherein said detected second positioning information is based on said determination.

16. The method of claim 11, wherein said XR imagery comprises one of a augmented reality (AR) imagery, virtual reality (VR) imagery, and mixed reality (MR) imagery.

17. The method of claim 11, further comprising:

identifying an identifier of the user from said request;

identifying contextual information related to the user based on said identifier; and customizing the XR imagery within the XR panel based on said contextual information.

* * * * *